(12) United States Patent
Chen et al.

(10) Patent No.: US 8,532,374 B2
(45) Date of Patent: Sep. 10, 2013

(54) COLOUR DOCUMENT LAYOUT ANALYSIS WITH MULTI-LEVEL DECOMPOSITION

(75) Inventors: Yu-Ling Chen, Epping (AU); Steven Richard Irrgang, Lane Cove (AU); Eric Wai-Shing Chong, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 12/327,247

(22) Filed: Dec. 3, 2008

(65) Prior Publication Data

US 2009/0148039 A1 Jun. 11, 2009

(30) Foreign Application Priority Data

Dec. 5, 2007 (AU) ................................ 2007237365
Dec. 18, 2007 (AU) ................................ 2007249098
Dec. 18, 2007 (AU) ................................ 2007249103

(51) Int. Cl.
*G06K 9/00* (2006.01)

(52) U.S. Cl.
USPC ......................................................... 382/164

(58) Field of Classification Search
None
See application file for complete search history.

(56) References Cited

U.S. PATENT DOCUMENTS

| 5,883,973 | A | 3/1999 | Pascovici et al. |
| 6,009,196 | A | 12/1999 | Mahoney |
| 6,115,496 | A | 9/2000 | Nguyen et al. |
| 6,118,552 | A | 9/2000 | Suzuki et al. |
| 6,947,595 | B2 | 9/2005 | Uchida |
| 6,993,185 | B2 | 1/2006 | Guo et al. |
| 2003/0088825 | A1 | 5/2003 | Chakraborty |
| 2003/0174889 | A1* | 9/2003 | Comaniciu et al. ........... 382/173 |
| 2007/0083883 | A1* | 4/2007 | Deng .............................. 725/19 |

FOREIGN PATENT DOCUMENTS

| WO | 96-39682 | 12/1996 |
| WO | 02-056255 A2 | 7/2002 |
| WO | 2006-066325 | 6/2006 |
| WO | WO 2006066325 A1 * | 6/2006 |

OTHER PUBLICATIONS

Examination Report dated Feb. 12, 2010 in Australian Application No. 2007249103.

* cited by examiner

*Primary Examiner* — Claire X Wang
*Assistant Examiner* — Thomas A James
(74) *Attorney, Agent, or Firm* — Fitzpatrick, Cella, Harper & Scinto

(57) ABSTRACT

Disclosed is a method of classifying segmented contents of a scanned image of a document. The method comprise partitioning the scanned image into color segmented tiles at pixel level. The method then generates superpositioned segmented contents, each segmented content representing related color segments in at least one color segmented tile. Statistics are then calculated for each segmented content using pixel level statistics from each of the tile color segments included in segmented content, and then determines a classification for each segmented content based on the calculated statistics. The segmented content may be macroregions. The macroregions may form part of a multi-layered document representation of the document. Each of a plurality of tiles of predetermined size of the image are converted into a representation having a plurality of layers, the representation corresponding to at least one said tiles comprising multiple colored layers, each tile comprising a superposition of the corresponding colored layers. For each of the colored layers, merging is performed with adjacent ones of the tiles, thereby generating a multi-layered document representation.

16 Claims, 13 Drawing Sheets

COLOUR DOCUMENT LAYOUT ANALYSIS WITH MULTI-LEVEL DECOMPOSITION

CROSS-REFERENCE TO RELATED PATENT APPLICATIONS

This application claims the right of priority under 35 U.S.C. §119 based on Australian Patent Application No. 2007237365, filed 5 Dec. 2007, Australian Patent Application No. 2007249103 filed 18 Dec. 2007, and Australian Patent Application No. 2007249098 filed 18 Dec. 2007, which are incorporated by reference herein in their entirety as if fully set forth herein.

TECHNICAL FIELD

The present invention relates to a method of document analysis and, in particular, to improving the speed of colour document segmentation and pixel level classification.

BACKGROUND

The proliferation of scanning technology combined with ever increasing computational processing power has lead to many advances in the area of document analysis. Document analysis systems may be used to extract semantic information from a scanned document, often by means of optical character recognition (OCR) technology. The scanning of a document results in the formation of a single layered image. Document analysis is used in a growing number of applications such as automated form reading. Such systems can also be used to improve compression of a document by selectively using a compression method appropriate to the particular content of each part of a page of the document. Improved document compression lends itself to applications such as archiving and electronic distribution.

Document analysis can typically be broken into three stages. The first of these stages involves pixel colour analysis. The second stage is document layout analysis, which identifies content types such as text, backgrounds and images in different regions of the page. The final stage uses the results of the first two stages and some further analysis to create a final output. The desired final output depends on the application.

Different methods for document layout analysis exist. Some methods partition the page into fixed sized blocks to give a coarse classification of the page. Methods such as these however can only give a single classification to a region, applying to the pixels of all colours within that region. For example, a region may be classified as containing text, but the pixels which are part of the text are not distinguished from the pixels in the background by that classification. In most such systems analysis is done in terms of a binary image, so it is clear that the text is one colour and the background another. In such cases, classifications of 'text' and 'inverted text' are sufficient to distinguish which is which. However, in a complicated multi-colour document, a single region may contain text of multiple colours, perhaps over backgrounds of multiple colours, including even natural images. In such cases, a binary image cannot be generated to sufficiently represent the text in the document without first analysing the document to determine where the text resides in different areas, which is itself the problem the system is trying to solve. In such a case, a coarse region-based classification, is not sufficient to represent the document content.

Other methods of document layout analysis use the background structure. Again however this is generally done on black and white images, and does not extend easily to complicated colour documents.

There is therefore a need for methods which provide a pixel level classification in a complicated colour document. Some methods do exist for this, however in providing an analysis at a pixel level, they generally lack context from the rest of the page, which may be helpful to the classification. Many such methods also involve a large number of operations to be applied for each pixel. For an application of document analysis embedded in a scanner, such methods may be too slow when running with the limited computational resources available inside most document scanners.

It is therefore desirable for document analysis to afford efficiency in an environment with low resources, and offer a pixel level of detail in classification. Further, it is desirable to make use of context over a large area for these classifications, and to perform well on colour documents with complicated layouts.

Some document layout analysis applications such as OCR, automatic form processing and other scan-to-high-level document processes require a segmentation step to decompose a document image from its raw pixel representation into a more structured format prior to the actual page layout analysis. This segmentation step dominates the overall speed and accuracy of these applications. Many existing applications employ a black and white segmentation, in which the document image is binarised into a binary image, consisting of black and white pixels. Regions are then formed by connected groups of black or white pixels. While binarisation is an efficient technique, it suffers from an inability to distinguish and isolate adjoining colours of similar luminance. Furthermore, it throws away much useful colour information during the process. For complex documents with multi-colour foreground and background objects, binarisation is clearly inadequate. Thus, a colour segmentation method is required.

Effective colour segmentation is a challenging problem. This is especially important for scanned images due to scanning and printing artefacts which can pose serious problems to identifying perceptually uniform colour regions. A perceptually uniform colour region in a digital image is a group of connected pixels (or pixels in close proximity) that a human observer interprets as semantically related. For example, the pixels that made up an alphabet character in a document image appear the same colour to the reader. However on a closer inspection, the number of colours is usually far higher because of printing and scanning artefacts such as halftone, bleeding, and noise. The challenge is to satisfy the competing requirements of remaining stable to local colour fluctuations due to noise, in what would otherwise be a unitary colour structure in the source image, whilst remaining sensitive to genuine changes, such as a change from white background to another light coloured background or smaller text in non constant coloured background.

Page decomposition is a form of colour segmentation that is specifically targeted at document image analysis. In addition to colour information, it uses knowledge of document layout structure, and text and non-text characteristics extensively to aid the segmentation process.

There are two main approaches to full colour page decomposition: bottom-up and top-down. The bottom-up approach examines each pixel in turn and groups adjoining pixels of similar colour values to form connected components. This method has the advantage of being efficient; however it is highly sensitive to noise and colour fluctuations because of its lack of context information. Thus, it tends to produce a large number of erroneous connected components, resulting in fragmentation. In contrast, the top-down approach partitions a page into non-overlapping blocks. Each block is analysed and given a label using local features and statistics extracted at its full or a reduced resolution. This approach only provides a coarse segmentation into regions of interest, e.g., Block A is likely to be text; and Block B is likely to be line-art. Pixel level segmentation can be achieved by further processing these regions of interest, but an additional pass is both slow in software implementations and expensive in a hardware implementation. With a single label per block, this approach is unsuitable for complex images where regions may consist of a number of different document content types, e.g., text over line-art.

There is a need for a colour segmentation technique that can decompose a document image into document object representations that can represent complex document contents with pixel level accuracy, and at the same time takes into account local context information that can be used to distinguish genuine changes from noise.

SUMMARY

Specifically disclosed is a method of generating a multi-layered document representation for classifying content components of a document from a single layered image.

In accordance with one aspect of the present disclosure there is provided a method of generating a multi-layered document representation of a document from an image of the document, the method comprising the steps of:

(a) converting each of a plurality of tiles of predetermined size of said image into a representation having a plurality of layers, the representation corresponding to at least one said tiles comprising multiple coloured layers, each said tile comprising a superposition of the corresponding said coloured layers; and (b) merging, for each of said coloured layers, adjacent ones of said tiles, thereby generating a multi-layered document representation.

Other aspects are also disclosed.

BRIEF DESCRIPTION OF THE DRAWINGS

At least one embodiment of the present invention will now be described with reference to the drawings, in which.

DETAILED DESCRIPTION INCLUDING BEST MODE

Digitising a paper document to an electronic form suitable for efficient storage, retrieval, and interpretation, is a challenging problem. An efficient document object representation is needed to solve this problem. Page decomposition is an important stage in representing document images obtained by scanning. The performance of a document analysis system depends greatly on the correctness of the page decomposition stage. Presently disclosed is a technique of document analysis and colour page decomposition for generating a multi-layered document representation from a single layered document image. This representation is capable of representing complex document images such as posters and brochures, where text on image and multi-coloured background is common. Specifically the original document may be considered a superposition of each of the layers of the multi-layered document.

Figure 5:
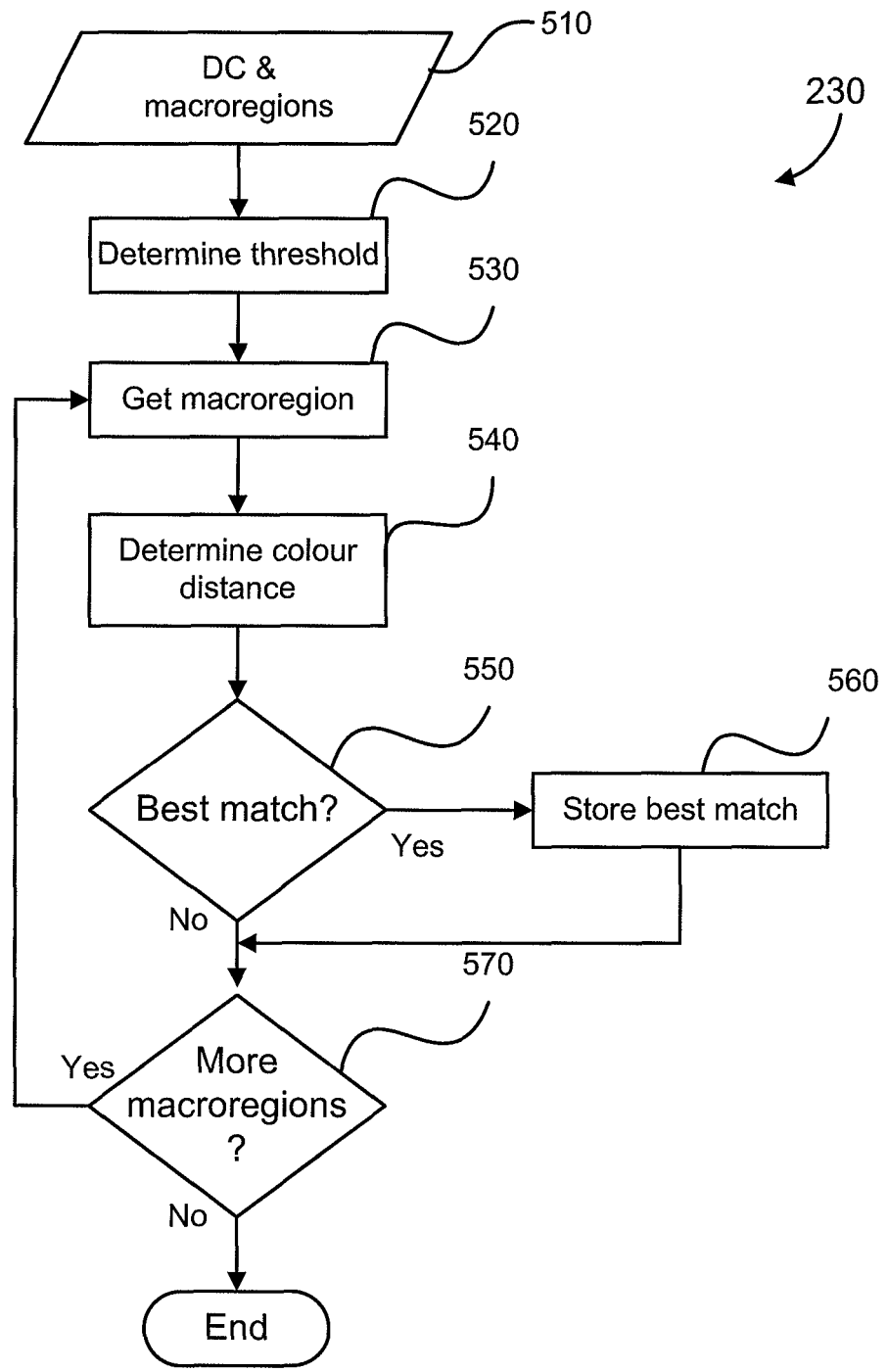
FIG. 5 is a flowchart illustrating a method for finding a merging macroregion candidate.
Figure 6:
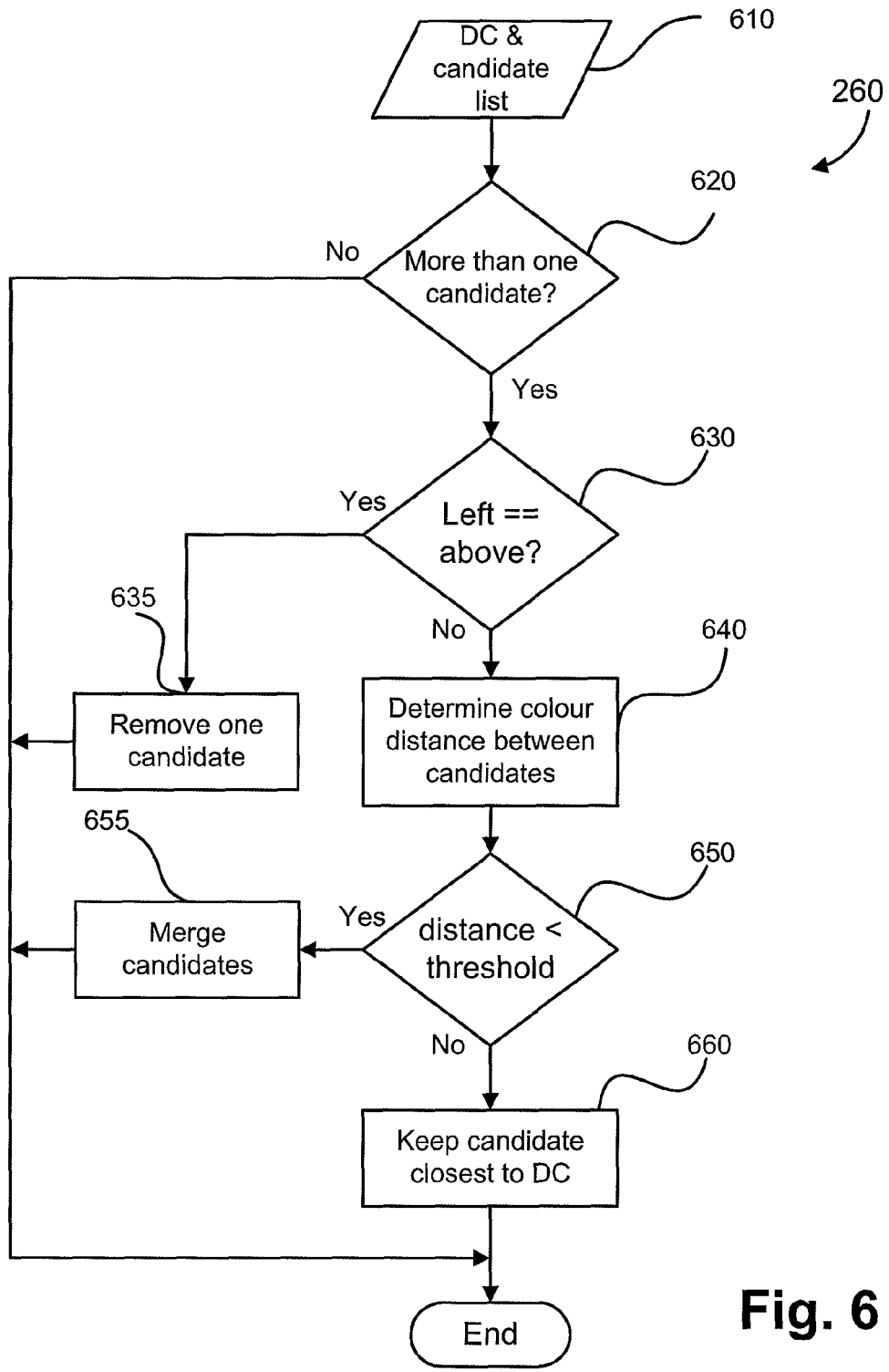
FIG. 6 is a flowchart of a method for comparing merging macroregion candidates.
Figure 7:
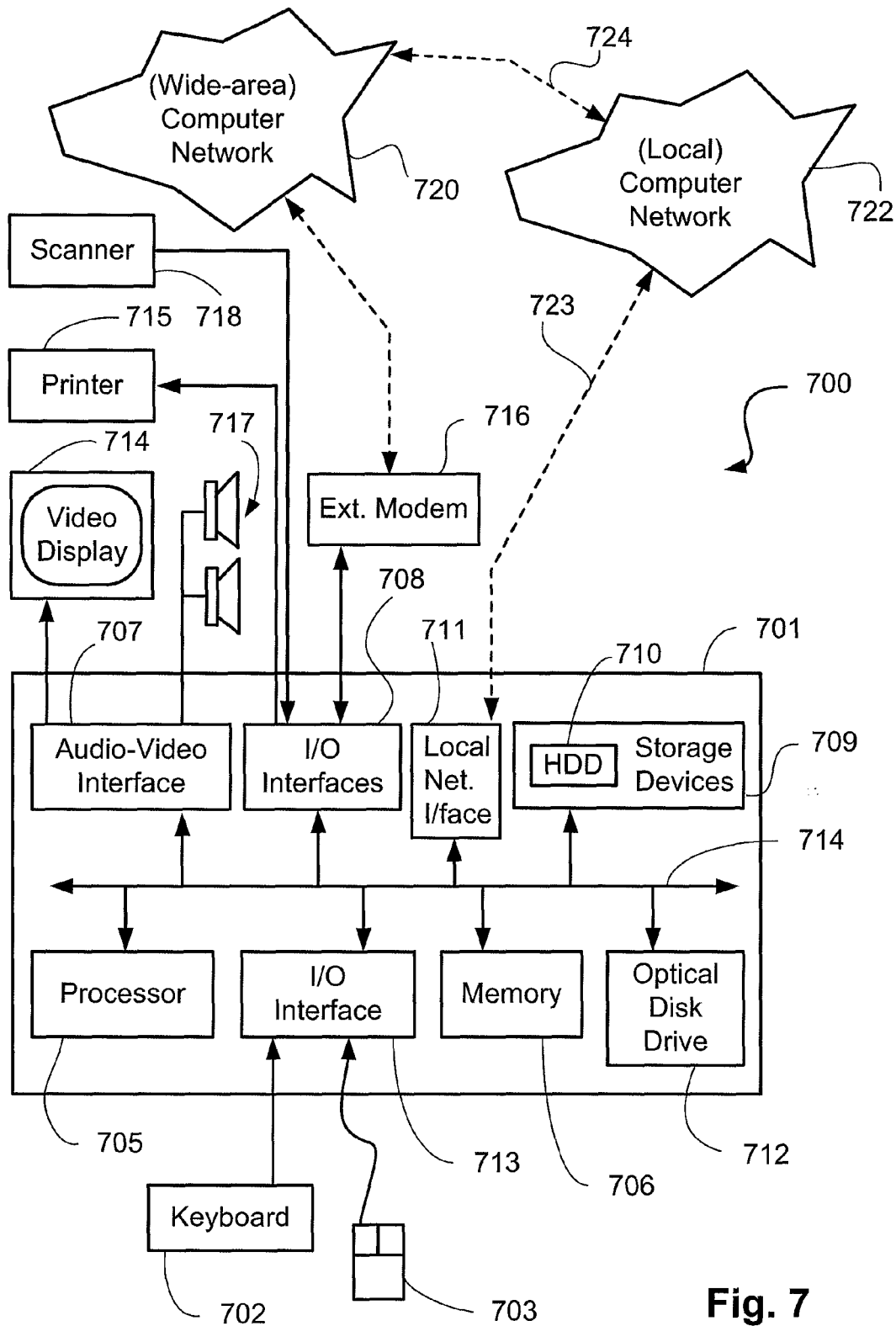
FIG. 7 is a schematic block diagram of a general purpose computer upon which arrangements described can be practiced.

The document layout analysis and colour page decomposition methods presently disclosed may be implemented using a computer system 700, such as that shown in FIG. 7 wherein the processes of FIGS. 1 to 6 and 8 to 12 may be implemented as software, such as one or more application programs executable within the computer system 700. In particular, the steps of the colour page decomposition methods are effected by instructions in the software that are carried out within the computer system 700. The instructions may be formed as one or more code modules, each for performing one or more particular tasks. The software may also be divided into two separate parts, in which a first part and the corresponding code modules desirably performs the document layout analysis and colour page decomposition methods and a second part and the corresponding code modules manage a user interface between the first part and the user. The software may be stored in a computer readable medium, including the storage devices described below, for example. The software is loaded into the computer system 700 from the computer readable medium, and then executed by the computer system 700. A computer readable medium having such software or computer program recorded on it is a computer program product. The use of the computer program product in the computer system 700 preferably effects an advantageous apparatus for document layout analysis or colour page decomposition, or both.

As seen in FIG. 7, the computer system 700 is formed by a computer module 701, input devices such as a keyboard 702, a mouse pointer device 703 and scanner 718, and output devices including a printer 715, a display device 714 and loudspeakers 717. An external Modulator-Demodulator (Modem) transceiver device 716 may be used by the computer module 701 for communicating to and from a communications network 720 via a connection 721. The network 720 may be a wide-area network (WAN), such as the Internet or a private WAN. Where the connection 721 is a telephone line, the modem 716 may be a traditional "dial-up" modem. Alternatively, where the connection 721 is a high capacity (eg: cable) connection, the modem 716 may be a broadband modem. A wireless modem may also be used for wireless connection to the network 720.

The computer module 701 typically includes at least one processor unit 705, and a memory unit 706 for example formed from semiconductor random access memory (RAM)

and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the external modem 716, scanner 718 and printer 715. In some implementations, the modem 716 may be incorporated within the computer module 701, for example within the interface 708. The computer module 701 also has a local network interface 711 which, via a connection 723, permits coupling of the computer system 700 to a local computer network 722, known as a Local Area Network (LAN). As also illustrated, the local network 722 may also couple to the wide network 720 via a connection 724, which would typically include a so-called "firewall" device or similar functionality. The interface 711 may be formed by an Ethernet™ circuit card, a wireless Bluetooth™ or an IEEE 802.11 wireless arrangement.

The interfaces 708 and 713 may afford both serial and parallel connectivity, the former typically being implemented according to the Universal Serial Bus (USB) standards and having corresponding USB connectors (not illustrated). Storage devices 709 are provided and typically include a hard disk drive (HDD) 710. Other devices such as a floppy disk drive and a magnetic tape drive (not illustrated) may also be used. An optical disk drive 712 is typically provided to act as a non-volatile source of data. Portable memory devices, such optical disks (eg: CD-ROM, DVD), USB-RAM, and floppy disks for example may then be used as appropriate sources of data to the system 700.

The components 705 to 713 of the computer module 701 typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations, Apple Mac™ or alike computer systems evolved therefrom.

The scanner 718 may be used to scan pages of documents to provide a scanned image to the computer module 701, for storage in the HDD 710, for example. That scanned image may then be subject to image analysis and other processing to perform the document layout analysis and colour page decomposition tasks to be described. Scanned images may alternatively or additionally be sourced from the networks 720 and 722, for example.

Typically, the application programs discussed above are resident on the hard disk drive 710 and read and controlled in execution by the processor 705. Intermediate storage of such programs and any data fetched from the networks 720 and 722 may be accomplished using the semiconductor memory 706, possibly in concert with the hard disk drive 710. In some instances, the application programs may be supplied to the user encoded on one or more CD-ROM and read via the corresponding drive 712, or alternatively may be read by the user from the networks 720 or 722. Still further, the software can also be loaded into the computer system 700 from other computer readable media. Computer readable storage media refers to any storage medium that participates in providing instructions and/or data to the computer system 700 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 714. Through manipulation of the keyboard 702 and the mouse 703, a user of the computer system 700 and the application may manipulate the interface to provide controlling commands and/or input to the applications associated with the GUI(s).

One or more of the methods of document layout analysis and/or colour page decomposition may alternatively be implemented in dedicated hardware such as one or more integrated circuits performing the functions or sub functions of colour page decomposition. Such dedicated hardware may also include one or more microprocessors and associated memories.

In this description, a colour distance is used in a number of places. This is understood to include any function that takes two colours and gives a number describing how close, in terms of colour proximity, those colours are to each other. A small distance indicates the colours are close to being identical (eg. pastel green and turquoise blue), whereas a large distance indicates dissimilar colours (eg. yellow and blue). In preferred implementation, a "city-block" $[|Y1-Y2|+|Cb1-Cb2|+|Cr1-Cr2|]$ distance in the YCbCr colour space is used. This is then adjusted based on the hue distance between the colours.

Figure 12:
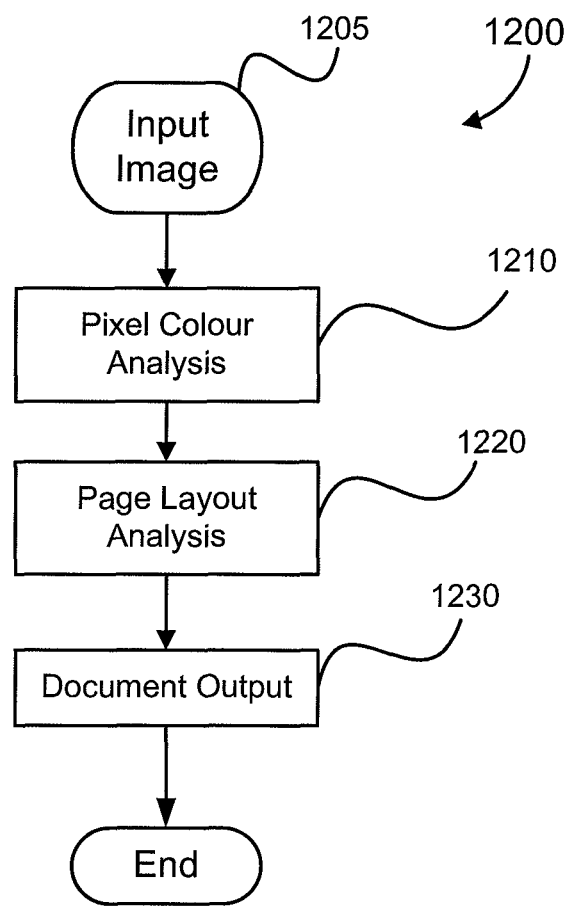
FIG. 12 is a high-level operational flowchart of a document analysis system.

FIG. 12 shows an overview of a document analysis system 1200 according to the present disclosure. Operational components of the system 1200 are desirably implemented as a software application stored on and executable within the computer system 700. The system 1200 receives as an input, a single layered image 1205, for example derived from the scanning of a hard copy document and thus representing raw image data. The document will typically be a "compound" document having text portion, and other image type portions including background fills or bitmap images. Processing of the input image 1205 commences with a pixel colour analysis process 1210. The input image is preferably an RGB image at a resolution of 300 dpi. In the presently described implementation, this includes breaking or partitioning the image 1205 into non-overlapping, uniform sized tiles, preferably of size 32×32 pixels and finding a small number of dominant colours and tile statistics to represent each tile. A tile of size 32×32 has 1024 pixels, thus giving it a maximum possible of 1024 distinct colours. However, at 300 dpi, a tile is a very small area, and can typically be represented by only a few colours. These colours are representative of the colours of the pixels in the tile and are referred to as the dominant colours of the tile. Useful tile statistics and information such as pixel count, edge ratios, bitmap, and shared boundary pixel counts for each dominant colour may be extracted in step 1210. Other statistics such as colour variance may also be calculated. Thus, a reference to a dominant colour refers to the representative colour of a set of pixels, and its associated statistics. The pixel colour analysis step 1210 may be implemented in a number of different ways. It may involve a number of image processing operations. A typical implementation may include the following processes: colour conversion, noise filtering, image enhancement, colour quantisation, dominant colour detection, and neighbourhood analysis, as known in the art. The colour analysed tiles are stored in the memory 709 for page layout analysis in step 1220.

Page layout analysis 1220 is then performed by executing a software application to classify each part of the page into one of a number of classes such as text, image, background and line-art. The analysis of step 1220 is described in more detail below with reference to FIG. 9. The consequence of the analysis 1220 is the creation of an output document 1230 which concludes the document analysis system 1200. The type of document output 1230 depends on the particular application for which analysis is being performed, and may include a compressed format, an editable document or a number of other document formats. Some of these outputs may also require additional processing.

Figure 9:
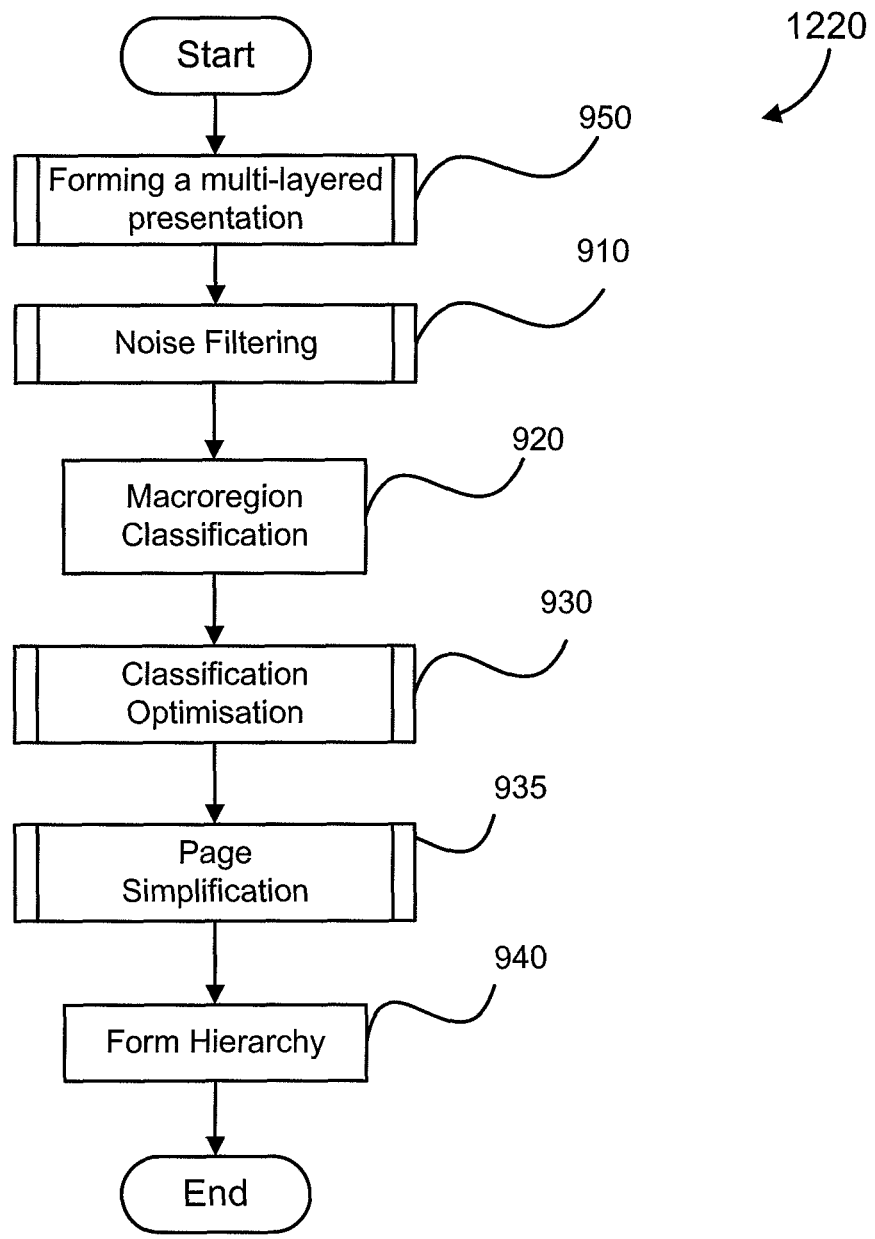
FIG. 9 shows the processing steps of a page layout analysis method.

FIG. 9 shows the basic breakdown of the page layout analysis stage 1220 of the system 1200. Each of the steps 910-950 of the stage 1220 will be described in more detail below. In the first step 950, a multi-layered presentation of the page is formed. The result of this stage is a set of macroregions. A macroregion in the context of the present description is a document structural object that encompasses a group of dominant colours with similar characteristics in close proximity. The grouping represents a region of semantically related coloured segments, such as a group of smaller regions, typically spread across a number of tiles, as will be described. This is performed in a fast, one pass process that may be done in parallel with, or using an output from, the pixel colour analysis 1210 performed earlier in the system 1200. In step 910, which follows step 950, noise filtering is performed to reduce the number of macroregions to processes in later the steps 920, 930 and 940. Step 920 then ascribes macroregion an initial classification to the macroregions based on colour and shape statistics associated with each macroregion. The statistics are used to interpret the context of content of each macroregion. In step 930, these classifications are improved and optimised using relationships between the macroregions. In step 940, a hierarchy is created for the macroregions representing which of the macroregions are contained within the context of other ones of the macroregions. Each of these steps will be described in more detail below.

Figure 10:
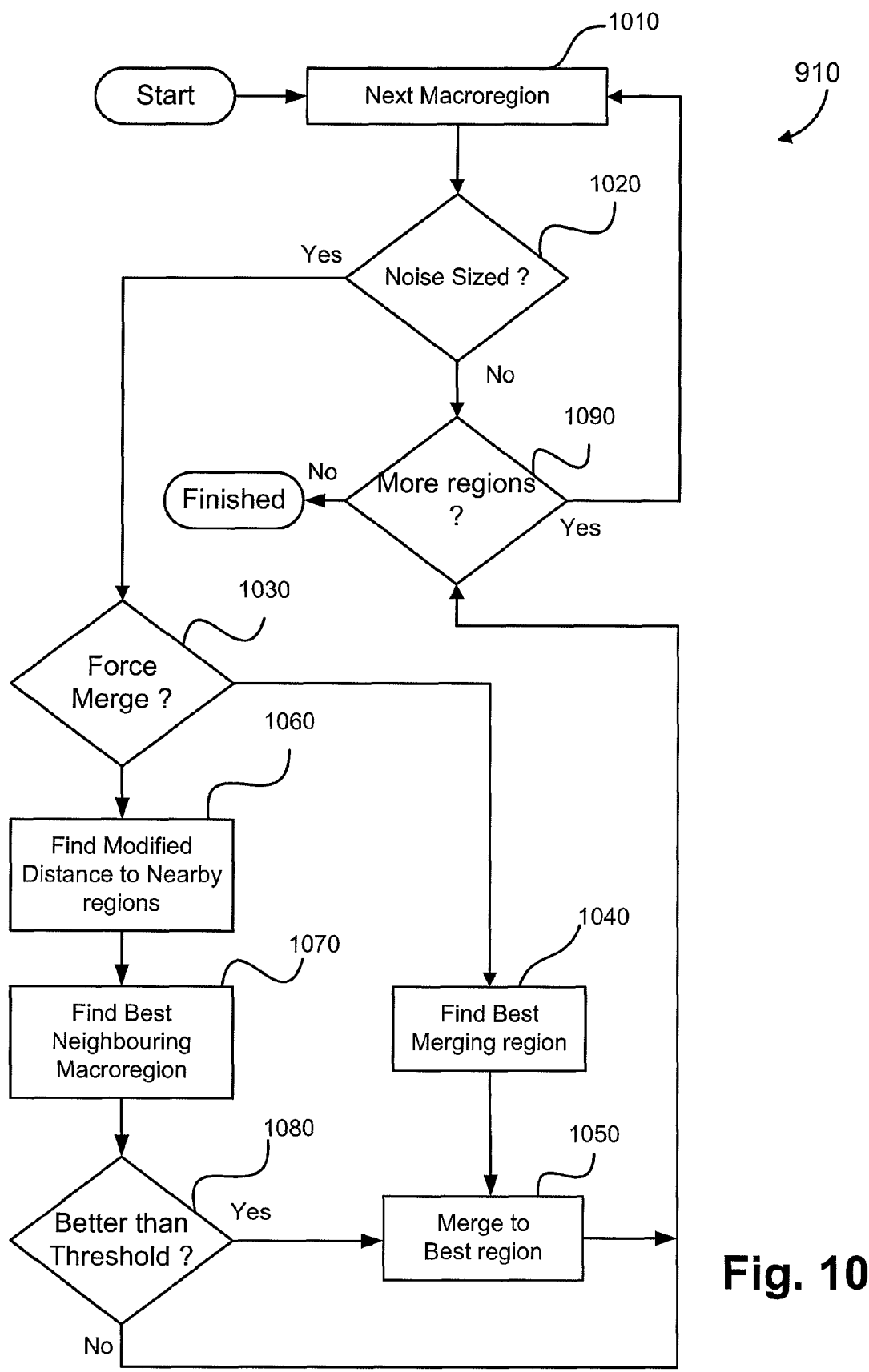
FIG. 10 is a flowchart describing the noise filtering stage of the system.

FIG. 10 shows the process of noise filtering 910 used in the arrangement of FIG. 9. Steps 1010 and 1090 operate so that each macroregion is processed in turn. In contrast to tile-by-tile based processing, the process of FIG. 10 is preferably performed across the whole page on a macroregion basis. In step 1020, the current macroregion is tested for whether it is a "noise" macroregion. In a preferred implementation, macroregions which either cover less than a predetermined number of (eg. 5) tiles of the page image, or which have a tile border pixel count which is greater than a predetermined percentage (eg. 95%) of the total number of pixels in the macroregion are considered to be noise macroregions on the basis of their size. The coverage value simply operates to exclude macroregions that are too small to influence the appearance of the document image. The tile border pixel count is an approach that reveals a statistic of the number of pixels in the macroregion which appear on one of the four borders of the tile they are in. In step 1030, macroregions are tested for whether to be force-merged. A macroregion is force-merged if a high proportion of pixels in the macroregion are on tile borders, this being another statistic, indicating the macroregions are sufficiently related to each other. If a macroregion is to be force merged, the best macroregion to which it is to be force merged with, is determined or otherwise found in step 1040. To do this, first the side (left, top, right or bottom) of the current macroregion with the most tile border pixels is found. The macroregion to which the current macroregion is to merge is required to be a neighbour on that side. Among the neighbours on that side, the macroregion chosen for merging is the one with the closest colour to the current macroregion. These two macroregions are then merged in step 1050, whereupon control returns to step 1090 to check for more macroregions.

If the current macroregion is not chosen to be force-merged, then step 1060 follows where each adjacent macroregion is given a score. The score is based on the colour distance between the macroregions. However, this distance may be reduced or modified if the two macroregions associated with each score have a large number of tile border pixels on common borders, and also adjusted for how the merge would affect the geometry of the larger macroregion. A measure used in a preferred implementation, representing the geometry of the larger macroregion, is the ratio of the number of tiles in the macroregion to the area enclosed by a bounding box of the macroregion.

The neighbouring macroregion with the smallest modified distance is then found in step 1070. The distance associated with this macroregion is compared to a fixed threshold in step 1080, and if it is close enough the current macroregion, is merged to the current macroregion in step 1050. In a preferred implementation, the statistics of the larger macroregion may not be updated based on the noise macroregion, as the values for noise macroregions are generally unreliable and may pollute the statistics of the larger macroregion. Otherwise the macroregion is assumed to be an area of page content which genuinely only covers a small number of tiles. One example of this could be a page number in an isolated corner of the page.

Processing then continues to the next macroregion, until all macroregions have been processed and step 910 of FIG. 10 concludes.

In step 920 each macroregion is given an initial classification, based on its own statistics. The method used for this classification in the preferred implementation is a support vector machine, using a set of features derived from the statistics gathered about the macroregion. Support vector machines are a method of machine learning for classification problems and are known in the art. Alternatively, other machine learning techniques such as neural networks, decision trees, or a set of human generated rules may be used for this classification. Features that may be used include:

(i) statistics such as average, and variance, on the number of pixels in dominant colours included in the macroregion;
  (ii) total number of dominant colours included in the macroregion;
  (iii) ratio of the number of dominant colours to the bounding box area;
  (iv) statistics based on the 'edge ratio's of the dominant colours in the macroregion. The 'edge ratio' for a dominant colour is the ratio between the number edges (pairs of adjacent pixels where one pixel is in this macroregion and the other pixel is not), and the total number of pixels;
  (v) average colour values for each macroregion;
  (vi) number of tiles quantised to 3 or more colours;
  (vii) number of other macroregions that this macroregion shares tiles with;
  (viii) total number of pixels on the tile borders of the macroregion;
  (ix) the contrast level between the dominant colours in this macroregion and other dominant colours from the same tile; and (x) the total number of dominant colours in the macroregion.

Using these features, a preferred implementation classifies each macroregion into one of three classes, being:
1. text;
2. flat colour areas; and
3. image.

The support vector machine used in the preferred embodiment is trained using a set of manually annotated truth values. Each macroregion in these test pages is given a classification from among the four classes, and these are used training and testing the support vector machine.

Figure 11:
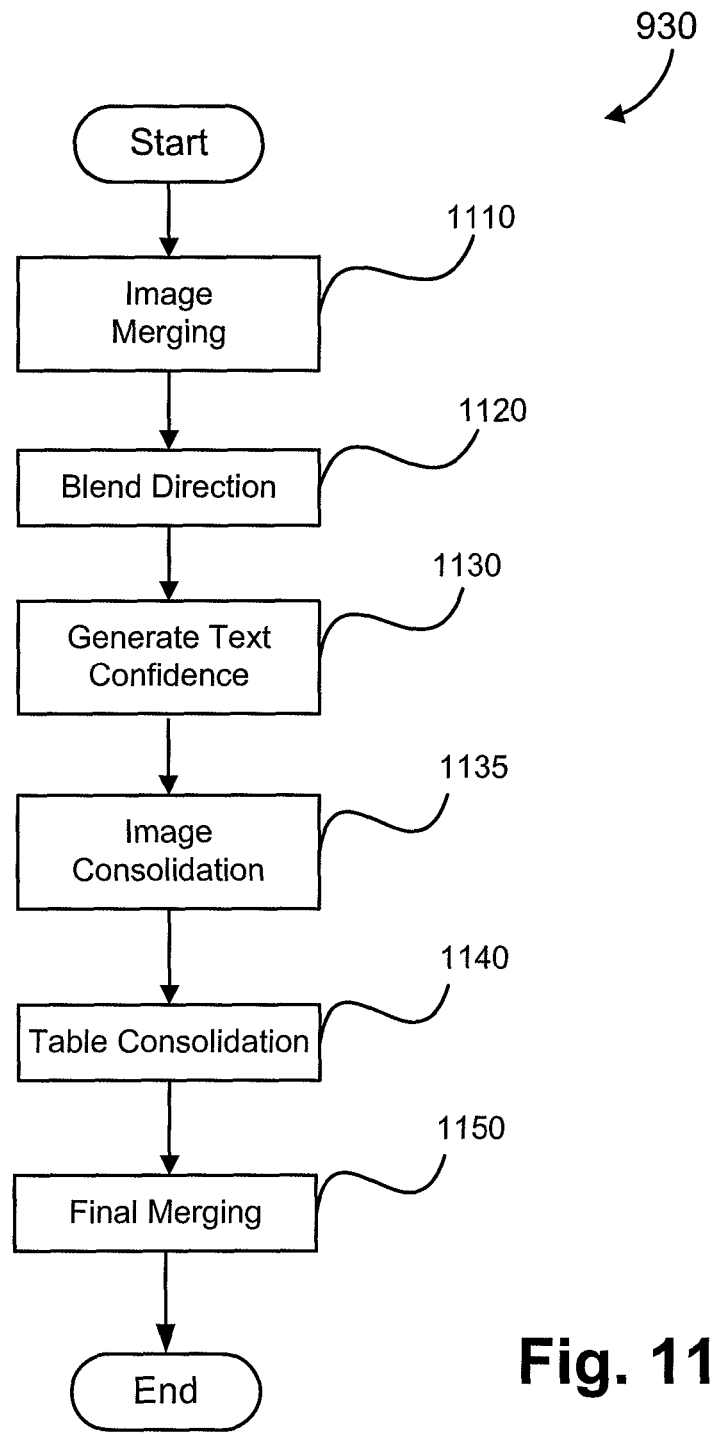
FIG. 11 is a flowchart showing the classification optimisation stage of the processing of FIG. 9.

FIG. 11 illustrates the classification optimisation stage 930 in more detail. This stage aims to improve the classification of step 920 and consolidate the macroregions.

In step 1110, macroregions classified as image are examined. Image regions on a page tend to include a number of different colours, and so they are generally represented by a number of overlapping macroregions with an image classification. Because of this, pairs of macroregions which are both classified as image and share a number of common tiles are merged together to consolidate the image. Once this consolidation is complete, unmerged image classified macroregions are reclassified to be of an 'unknown' type, as if there are no other image classified macroregions nearby it is likely that they were originally misclassified as image.

In step 1120, blend detection is applied. This is to help deal with areas of the input page which are a continuous blend from one colour to another. These areas can often confuse the later stages of processing if not detected at this stage. Blends are detected in the preferred implementation by searching for pairs of macroregions with the following properties:
(i) the local colours in adjacent tiles between the two macroregions are very similar, despite the overall average colours of the two macroregions being different;
(ii) the macroregions share a lot of adjacent tiles but only rarely appear in the same tile; and
(iii) the macroregions tend to have a high and equal number of border pixels on either side of the shared border between adjacent tiles.

Pairs of macroregions with these properties are likely to be from a blended area of the page, and so they are merged together at this stage.

In step 1130, a text confidence level is calculated for each macroblock. The text confidence value is an estimate of the probability of the macroblock being made up of predominantly text content.

The initial values for text confidence are based on the macroblock's existing classification. Text classified macroblocks start with a high text confidence, while macroblocks originally classified as image or background start with low text confidence values. These values are then updated based on context. For each pair of adjacent macroblocks, the text confidence values are adjusted. As text generally does not overlap other text, if a first macroblock with high text confidence overlaps a second macroblock then the text confidence of the second macroblock should be reduced. In the current embodiment, an adjustment is made for both macroblocks each based on the text confidence values of the other. The size of the adjustment is also scaled proportionally to the number of tiles in which the macroblocks overlap.

This adjustment is performed for each pair of macroblocks over a number of iterations. The end result of all the iterations is an adjusted text confidence value for each macroblock.

An alternative method of step 1130 is now described. This alternative is less desirable as it will not allow page simplification step 935 to be performed as effectively. In this alternative, another reclassification is done on each of the non-image macroregions, taking into account the way in which these macroregions overlap each other. To do this, a graph of the macroregions is formed with edges between each pair of macroregions which include different colours from a common tile. A global cost function is then formed on the graph based on a given classification of the macroregions as text or flat. The cost function desirably includes the following terms:
(i) a cost is given to each edge between two macroregions with the same classification, weighted by the number of common tiles the two macroregions share; and.
(ii) a cost is given to each macroregion which has changed its classification from the original classification given in step 920.

The classification of non-image macroregions into text or background which minimises this cost is then found. For this, each macroregion is initialised to its current classification. Macroregions previously classified as image and now unknown are initialised to the flat classification. The each macroregion in turn is tested to see whether changing its classification would reduce the global cost, and the classification is changed if this is the case. This is repeated in a number of iterations until no more changes are made. Note that this may not find the global minimum of the cost function, but it will find a local minimum close to the original classifications. This may even be a better result than the true global minimum of the cost function. At the end of this alternative, macroregions classified as text may be given a high text confidence, and macroregions classified as background a low text confidence.

In step 1135, image consolidation is performed. Many parts of image areas may not have been classified as image originally. The classification may have failed to give an image classification for the macroblocks in these parts. Also if parts of the image have a similar colour to the background those parts may have merged with the background macroblock, preventing them from being classified separately as image areas. Simplifying image regions can save processing time and memory, so it is desirable to merge all areas of an image region together.

To do this, a rectangular area is considered for each identified image region. Initially this area is the bounding box of the image region, shrunk by one tile in each direction. Then, if the top row contains of the rectangular area contains a significantly smaller number of image tiles than the average for the other rows, the rectangular area is shrunk by removing the top row. This is repeated until a relatively dense top row is found. Similar processing is used to shrink the region further on the other four sides.

Once the rectangular region is found, each dominant colour in each tile contained within the region is examined. If the macroblock containing that dominant colour in that tile has a high text confidence, the dominant colour is left as it is. Otherwise, the dominant colour is removed of the macroblock it is in, and placed into the image macroblock instead. The end result of step 1135 is much more solid image regions, without losing any high confidence text that may have been over the image regions. Step 1140 is then implemented by which table consolidation is performed. This stage attempts to merge fragmented foreground regions, particularly tables. Macroregions classified as Text are considered as foreground regions and other types are considered as background regions. For very thin lines, often the colour information from the scanner and the earlier stages of processing may be inaccurate, causing fragmentation of otherwise related or close colours across different macroregions. For example, for very thin lines, colour fringes may occur due to the different locations of the sensors of different colours. Printer colour registration problems can also cause a similar effect. In this case, objects such as tables may be fragmented into multiple macroregions, which may not merge together if their colours are too far apart. To account for possible colour differences in different parts of the same foreground object without merging things which should not be merged, other evidence is used to determine whether certain foreground macroregions should be merged together.

In step 1140, each pair of adjacent foreground macroregions is given a distance based on a combination of the following pieces of evidence:
(1) the colour distance between the two macroregions;
(2) an overlap factor. This accounts for the number of adjacent tiles between the macroregions and thus an extent of overlap. A multiple of the number of tiles where the two macroregions both appear together is then subtracted from this. The goal is that if the macroregions share a lot of tiles then this factor will be a penalty, making the macroregions less likely to merge, while if they share a lot of adjacent tiles without appearing in the same tiles this factor will increase the likelihood of them merging;
(3) a tile border factor. Each time macroregions appear in adjacent tiles, a score is given based on how many pixels from each macroregion are on the tile border. If a roughly equal number of pixels are on both sides, then this factor will make the macroregions more likely to merge, while if the values are often very different then they will be less likely to merge;
(4) an edge ratio similarity factor. This causes macroregions with similar edge ratios in adjacent tiles to be more likely to merge together, and macroregions with very different edge ratios to be less likely to merge; and
(5) an amount of evidence factor. This is used to account for when the other factors are based on very small amounts of evidence. If there are not many adjacent tiles between the two macroregions, and so not much evidence for or against their similarity, then this factor will make them less likely to merge.

Macroregions which are part of a fragmented text or table region should have the property that they cover distinct but adjacent areas, have similar statistics, and have objects which connect from one macroregion to the next across the adjacent tiles. The factors above are designed to detect this situation and enable such macroregions to merge even in cases where various artifacts may have caused the colours to be significantly different.

In step 1150, a final merging is done between any nearby (proximate) macroregions which have similar colours and the same classification. In earlier stages, macroregions may be separated despite having similar colours, if it is considered possible that they represent different types of page content. Colour similarity may be assessed using colour distance determination and comparison against a threshold. Now that all the classification has finished, if they have been classified as representing the same type of page content, then they can be merged. Classification optimization of step 930 therefore ends.

In step 935, page simplification is performed. In some systems, limited memory may be available for later processing. To ensure that complicated pages do not cause later processing to run out of memory, complicated pages may be simplified, hopefully reducing the memory required for later processing without removing the important parts of the page.

Figure 13:
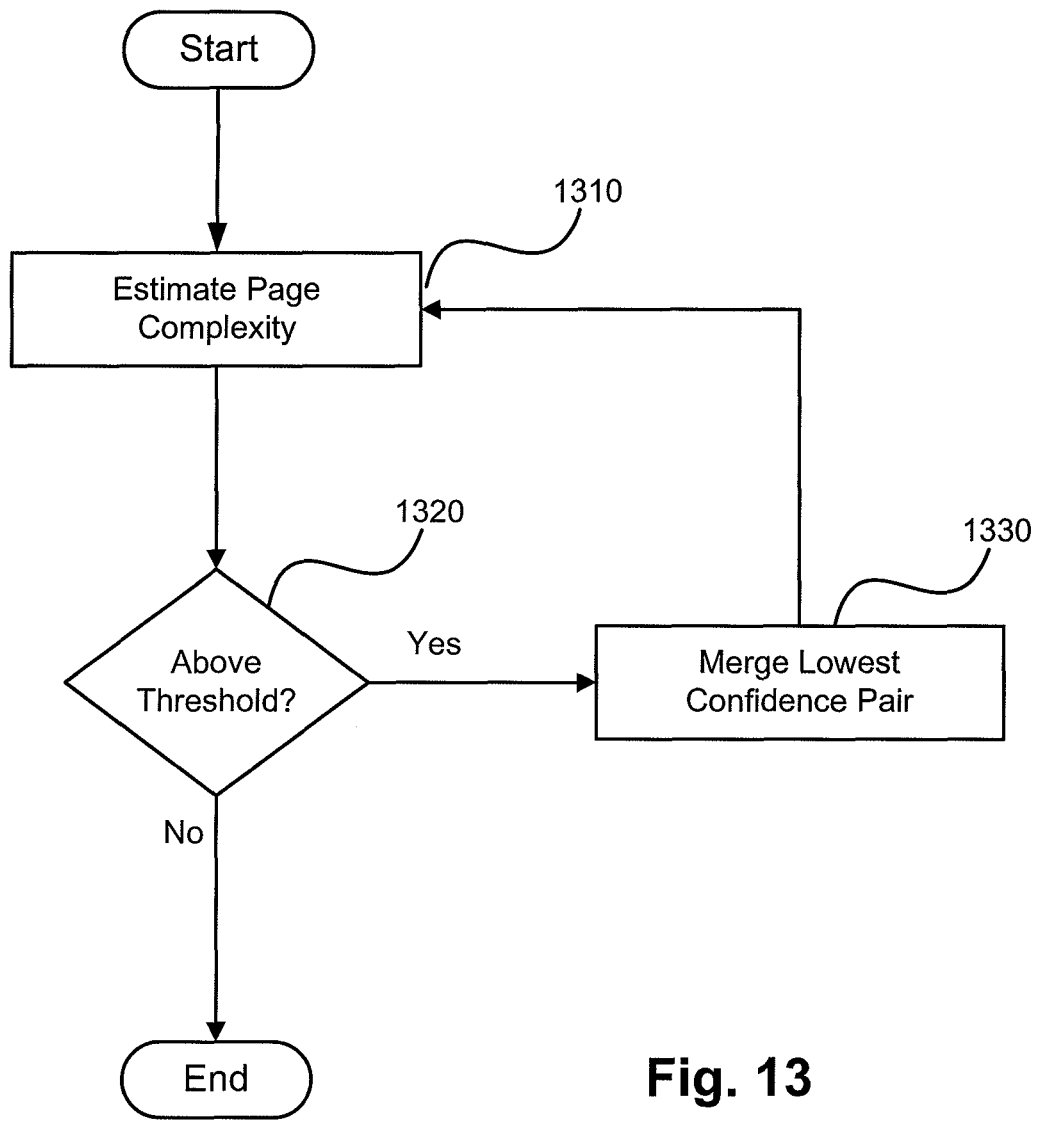
FIG. 13 is a schematic block diagram representation of general purpose computer system upon which the arrangements presently described may be performed.

FIG. 13 illustrates the page simplification process of Step 935 in more detail. In step 1310, an estimate is made of the page complexity. In the current embodiment, this is the sum of the number of edges in each macroblock. The number of edges in the macroblock may be estimated by multiplying the edge ratio statistic by the number of pixels in the macroblock. The number of edges on the page is a good estimate of the complexity of the page for connected component based analysis.

In step 1320, this page complexity estimate is compared to a threshold. The threshold value will depend on the amount of memory available for later processing, as well as on the approximate amount of memory needed per edge in the image. If the number of edges in the image is below the threshold value, then the page does not need simplification and the page simplification process is complete. However, if the number of edges is too high, the complexity of the page needs to be reduced.

In step 1330, a pair of macroblocks is found for merging. Only overlapping macroblocks are considered for merging, as merging two macroblocks from different areas of the page will not help reduce the number of edges on the page. In the current embodiment, the most important aspect for later processing is the text, so it is important that any macroblocks containing text are not merged with other macroblocks. To give the best chance of preserving the text, the pair of overlapping macroblocks with the lowest combined text confidence is found, and these two macroblocks are merged together.

After these two macroblocks are merged, the processor returns to step 1310, to re-estimate the page complexity. After merging macroblocks, the new page complexity may be estimated based on the old page complexity and an estimate of what effect merging the two macroblocks had, rather than calculating it for the entire page from scratch.

This process will continue until the page complexity is considered low enough. Page simplification of step 935 is then complete.

Returning to FIG. 9, the next stage in the macroregion analysis process 1220 is to form a hierarchy from the macroregions in step 940. This hierarchy is represented in terms of at most one parent macroregion associated with each macroregion. If a text macroregion is determined to fit within the bounding box a particular background, then the macroregion representing that background will become its parent. If a background macroregion of a particular colour is surrounded by a larger background of a different colour, then the larger background will be a parent of the smaller background.

The rules used for determining the hierarchy in the preferred implementation are that the parent of a macroregion is the smallest non-text other macroregion which has a bounding box completely containing it. The final macroregion classifications must be different for hierarchical association between macroregions.

The net result of the process 1220 described above is a classification of macroregions of a mixed content document from an original image. This is achieved using pixel level analysis and colour document segmentation.

Figure 1:
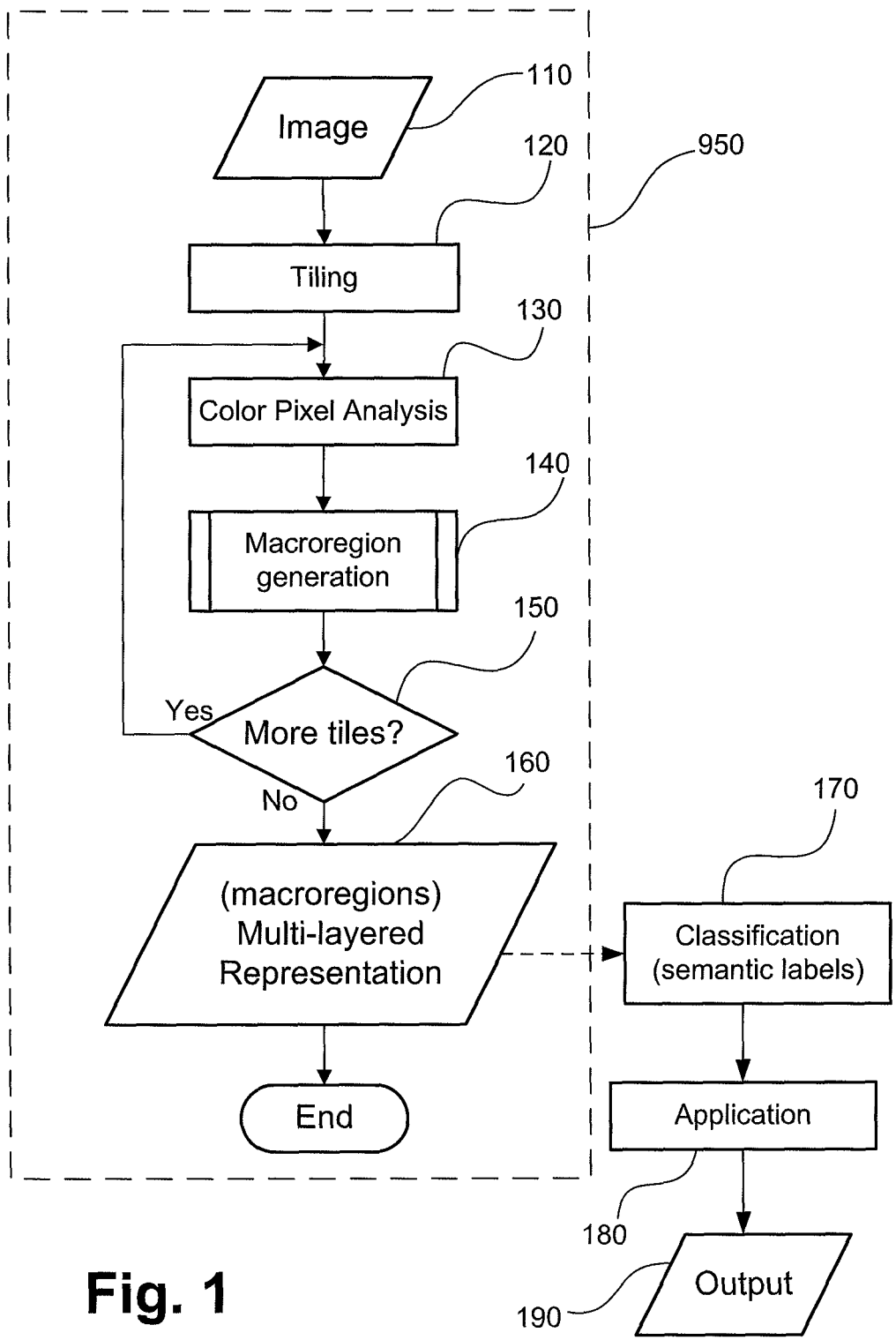
FIG. 1 is a flowchart illustrating a method for decomposing a colour document into a multi-layered representation.

FIG. 1 is a flowchart of a method of step 950 for decomposing a coloured image into a multi-layered representation. The process in FIG. 1 employs a loop structure, and begins at step 120 where an input image 110 (eg. the image 1205), preferably an RGB image at a resolution of 300 dpi, is partitioned into non-overlapping, uniform sized tiles, preferably of size 32×32 pixels. The tiles are preferably processed in raster order—that is from left to right, and top to bottom. The first tile to be processed is the top-left tile of the input image, and the last tile to be processed is the bottom-right tile of the input image. This form of tiling is used for efficiency purposes. Alternatively, overlapping and non-fixed size tiles may be used. The tiles may alternatively be referred to as blocks.

Steps 130 to 150 form a loop which processes each of the tiles. Step 130 receives tile data preferably in tile raster order, and in which every tile undergoes a detailed pixel colour analysis to generate dominant colours and tile statistics. A tile of size 32×32 has 1024 pixels, thus giving it a maximum possible of 1024 distinct colours. However, at 300 dpi, a tile is a very small area, and can typically be represented by a limited number of colours. These colours are representative of the colours of the pixels in the tile and are referred to as the dominant colours of the tile. Where desired, step 130 may be performed outside of the loop, immediately after step 120.

Pixels with the same dominant colour may or may not be connected. This can be seen in FIG. 4(a) where two tiles 401 and 402 are shown side-by-side and which have dominant colours 403, 404 and 405. It is seen that the colour 405 represents one "connected" region, whereas each of the colours 403 and 404 has two connected regions 406,407 and 408,409 respectively. Useful tile statistics and other information such as pixel count, edge ratios, bitmap, and shared boundary pixel counts for each dominant colour may be extracted in step 130. Other statistics such as colour variance may also be calculated. Thus, a reference to a dominant colour refers to the representative colour of a set of pixels, and its associated statistics. The pixel colour analysis step 130 may be implemented in a number of different ways. It may involve a number of image processing operations. A typical implementation may include the following processes: colour conversion, noise filtering, image enhancement, colour quantisation, dominant colour detection, and neighbourhood analysis, as known in the art.

It has been determined through numerical experiments that a majority of the tiles in a document image with foreground information can be reliably represented by four colours or less. Tiles may also be represented by more than four colours.

Figure 3A:
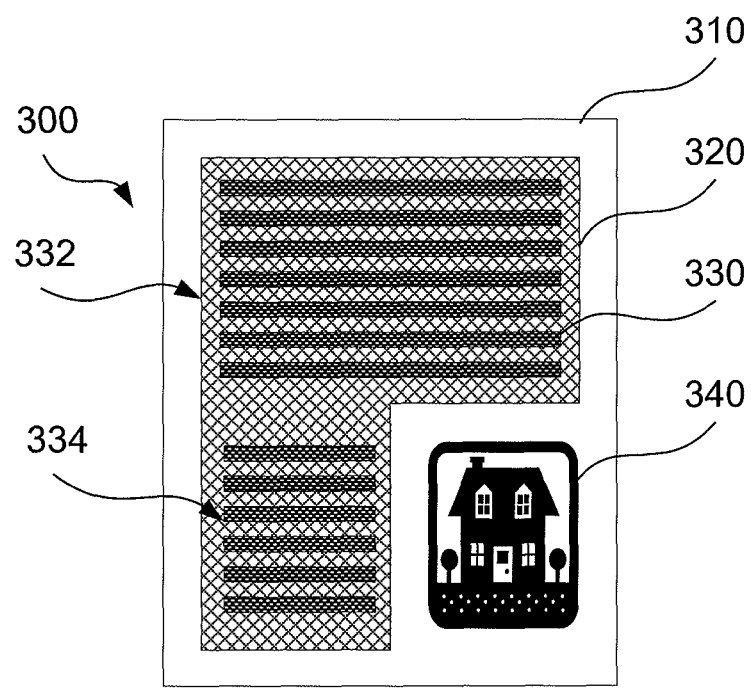
FIGS. 3(a) and 3(b) illustrate macroregions of a typical document.
Figure 3B:
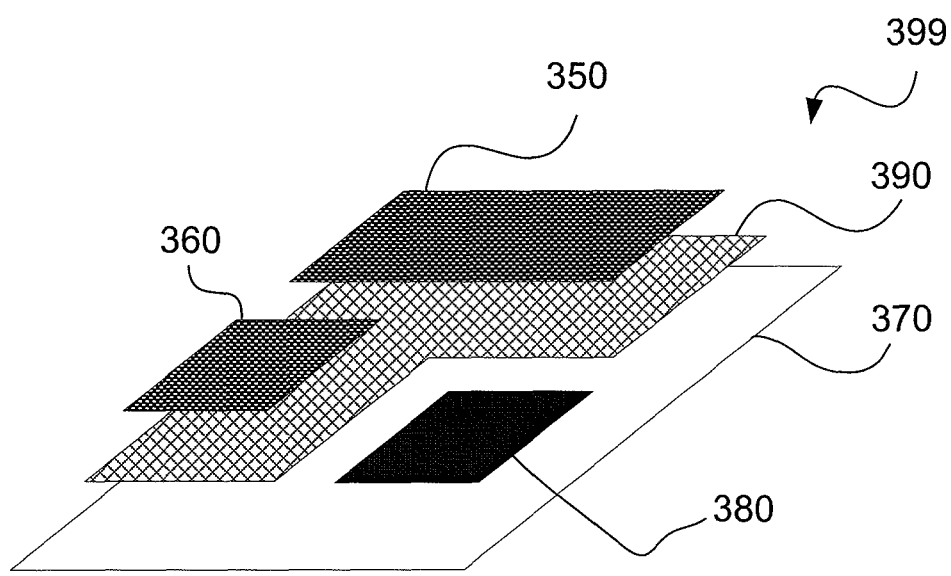

Step 140 operates to generate macroregions. FIGS. 3(a) and 3(b) provide illustrations of macroregions on a typical document. In FIG. 3(a), a scanned document forming a single layered image 300 is shown composed of four types of objects, being an overall (white) background 310, a local (coloured) background 320, lines of (black) text 330 formed as two paragraphs 332 and 334, and an image/graphical object 340. FIG. 3(b) shows how these four types of objects may be grouped into multiple semantically coherent regions or macroregions that collectively form a multi-layered representation 399. It can be seen that each object type forms at least one macroregion. The background 310 forms a macroregion 370, the image 340 forms a macroregion 380, and the local background 320 forms a macroregion 390. The text lines 330 produce two macroregions 350 and 360 due to the significant gap between the two paragraphs 332 and 334. Although not accurately depicted in FIG. 3(b) the layer 370 has cut-outs sized and shaped to accommodate the overlying macroregions 380 and 390, and further, the macroregion 390 has cut-out corresponding to the outlines of the particular text characters present in the layers 350 and 360. As a consequence, when the various macroregions 350-390 are superimposed as their layers they collectively represent the image 300. Note that the layering described here is not the same as layered objects in a graphical object rendering system where each object may have its own "z-level". In this description, the layers are for representative purposes to illustrate how the various macroregions superimpose.

Figure 4A:
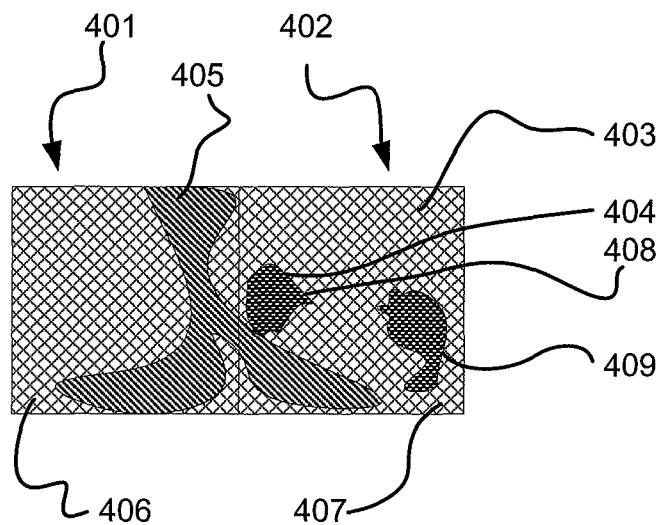
FIGS. 4(a) and 4(b) depict macroregion generation at tile level.
Figure 4B:
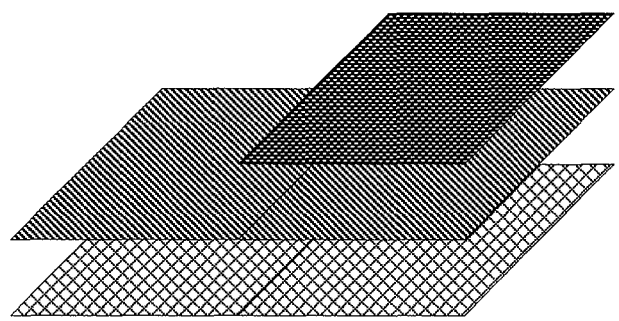

FIG. 4(b) is an illustration of macroregions at tile level. In FIG. 4(a), the left tile 401 contains two dominant colours 403 and 405, and the right tile has three dominant colours 403, 404 and 405. Each dominant colour may be associated with a number of segments. For the purpose of macroregion generation, segments of the same dominant colour are treated as a single entity, whose combined statistics are used for determining merging decisions. Thus any reference to a dominant colour of a tile refers to all the tile segments with the same dominant colour and its associated statistics. In this example, dominant colour segments with similar tile statistics are filled with the same pattern. These segments merge across the tile border, based on their statistics, to form three macroregions as shown in FIG. 4(b), corresponding to the dominant colours 403, 404 and 405. It can be seen that the left tile 401 belongs to two macroregions, while the right tile 402 is part of three macroregions.

A macroregion or a memory record of a macroregion may include the following data features: an average colour, bounding box coordinates, a binary mask, the number of tiles, the number of pixels, the number of neighbouring macroregions, pointers to those neighbours, and various statistics derived from edge, colour and contrast information within the macroregion.

Processing in step 140 begins by receiving tile dominant colour and statistics in tile raster order, and by which each dominant colour is either merged to an existing macroregion or converted to a new macroregion. Details of this macroregion generation process 140 will be explained further with reference to FIG. 2 below. Step 150 tests if any more tiles remain to be processed. If so, the method 950 returns to step 130 to perform pixel analysis on the next tile. Where there are no more tiles, the method 950 ends and the resulting macroregions form a multi-layered representation 160 of the input image 110.

By decomposing the document image 110 into the multi-level overlapping document object representation 160, it is possible to satisfy the conflicting requirement of remaining stable to local colour fluctuations due to various undesirable noises, and remaining sensitive to genuine changes in the document. This multi-layered representation 160 may be further processed by a classification stage 170 (for example, equivalent the classification step 920 described above) to provide semantic labels to the macroregions. These labels can be used in a variety of applications 180 to generate a final output 190. Some typical examples of the applications 180 include document compression, OCR, and vectorisation.

Figure 2:
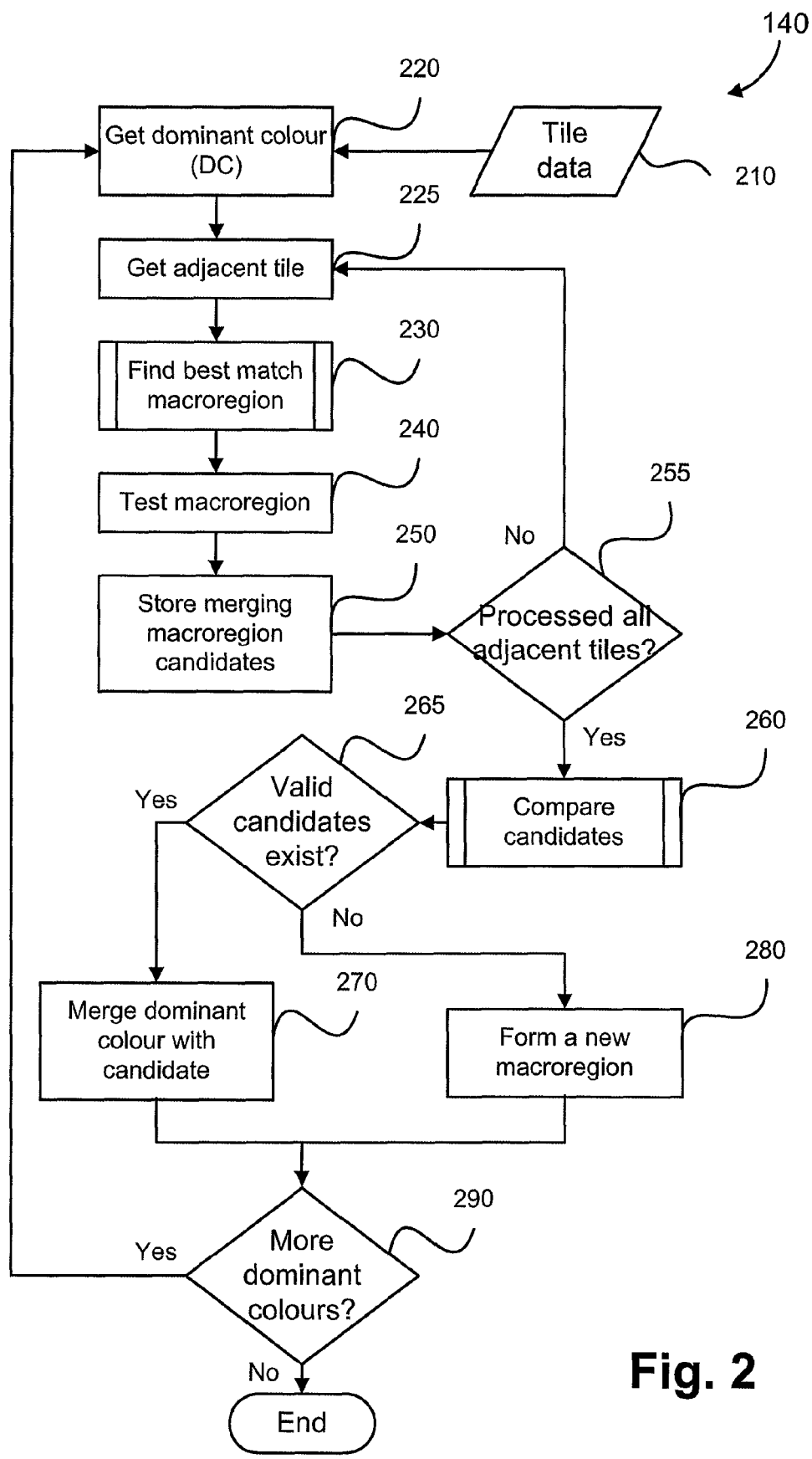
FIG. 2 is a flowchart illustrating a method for macroregion generation.

The macroregion generation step 140 is further expanded upon in FIG. 2. A macroregion is formed by merging dominant colours with similar tile statistics in adjacent tiles. The purpose of this step is to find suitable neighbouring macroregions for the current dominant colour to merge with. If there are no suitable neighbouring macroregions, a new macroregion is formed using the current dominant colour. In tile raster order processing, with the exception of the first raster row of tiles, at any instance there are two adjacent previously considered tiles to the current tile location: one from above and one from left. It is important to note that a tile may belong to more than one macroregion. In the preferred implementation, the first raster tile doesn't merge, and in first row, the current tile can merge with left adjacent tile.

The process 140 in FIG. 2 begins with the current tile data and statistics as an input 210. Step 220 commences a loop that operates for each dominant colour in the current tile. With a dominant colour, step 225 then obtains an adjacent tile. This adjacent tile can either be from above or left. In step 230, the most suitable macroregion for merging from the adjacent tile is chosen as a "best match macroregion". The process of step 230 of determining the best match macroregion is further described below with reference to FIG. 5. A test is then performed in step 240 on the best match macroregion to further determine its suitability for merging. This best match macroregion is stored, for example in a location in the HDD 710 in step 250 if it passes the test, otherwise that macroregion is ignored. The storage in step 250 creates a list of candidate macroregions in memory. Processing continues at decision step 255 which it checks whether all adjacent tiles have been processed. If not, control returns to step 225 and the remaining adjacent tiles are processed. The processes described provide for the merging of macroregions of adjacent (above and left) tiles. Depending upon the type of implementation, merging may be performed with other connected tiles such as diagonal tiles.

Once all the adjacent tiles have been processed, the potential merging candidate macroregions are compared in step 260 in order to select or consolidate the merging candidates into a final merging candidate. Step 260 is described in detail below with reference to FIG. 6. A check at decision 265 is performed to determine if the candidate list, formed from step 250, is empty. If the list is empty, a new macroregion is formed using the current dominant colour and statistics in step 280. Otherwise the current dominant colour is merged with the final candidate in step 270. Step 290 tests for a further dominant colour within the tile and if such exists then returns to step 220 to re-commence the loop. This process is repeated for each of the dominant colours within the current tile.

FIG. 5 illustrates step 230 in greater detail. The purpose of this step is to find the best matching candidate from the neighbouring macroregions. The process 230 takes the dominant colour statistics and the macroregions 510 associated with the adjacent tile as an input. An adaptive threshold for minimum colour distance is determined in step 520. The adaptive threshold is made looser for dominant colours with few pixels. It is also adjusted according the edge ratio and tile border pixel count of the dominant colour segments. The threshold is determined from the colour and the geometry of the distance between the candidates from adjacent tiles. In step 530 each adjacent macroregion is selected in turn. The colour distance between the current dominant colour and this selected macroregion is then calculated in step 540. This distance may be calculated using the Euclidean (direct) distance or the city block (Manhattan) distance.

A check in step 550 is performed to determine if the determined colour distance is closer than the current closest distance. The closest distance in step 550 starts with the threshold decided in step 520 and may be replaced with a smaller distance stored in step 560. If it is (Yes), this macroregion and its colour distance are stored in the memory 709 in step 560 and the process 230 moves to step 570. Otherwise processing continues at decision step 570 to test for more macroregions. If such exist, control returns to step 530 until there are no more macroregions to process.

Figure 8:
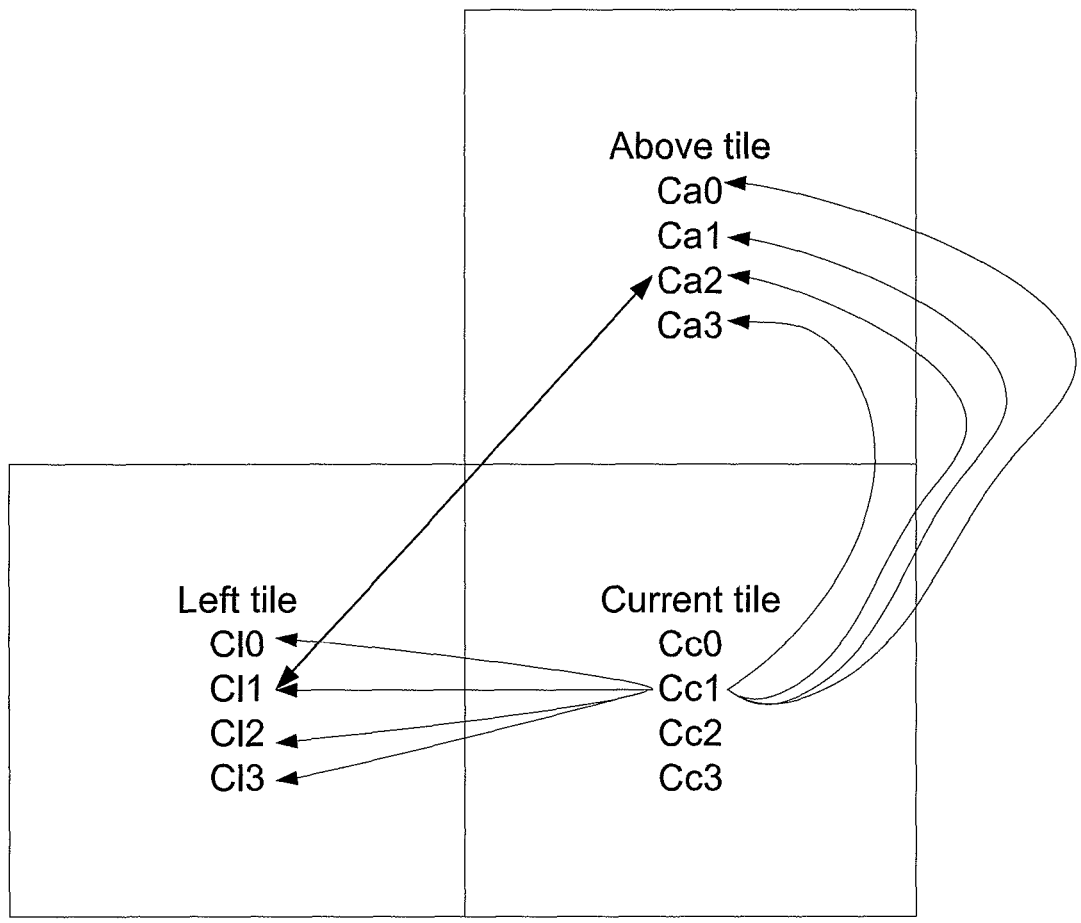
FIG. 8 illustrates the dominant colour comparison between adjacent tiles.

FIG. 6 illustrates step 260 in greater detail and which involves a number of merging criteria. Processing begins with the dominant colour and a list of macroregion candidates 610 being received as input. A check is performed in decision step 620, as a first criteria to determine if the number of candidates is greater than one. If the answer is No, the processing of step 260 terminates. Otherwise, processing moves to step 630, where the candidate from the left adjacent tile is checked with the candidate from the above adjacent tile. If the two candidates are the same, forming a second criteria, one of the candidates is removed from the candidate list in step 635, and the process 260 again terminates. Otherwise the colour distance between the two candidates is determined in step 640. This distance is calculated preferably using the Euclidean distance. Other distance metrics such as city block distance may also be used. If the colour distance is below a predetermined threshold, as determined in step 650 representing a third criteria, the two candidates are merged in step 655, and processing again ends. Otherwise, the candidate with the closer colour distance to the dominant colour is chosen as a final merging candidate, while the other candidate is ignored. The process performed by FIG. 6 is depicted in FIG. 8 for a current tile and its two adjacent (left and above) tiles. Each tile may have up to four dominant colours. For each dominant colour in the current tile, a distance measure is made with each dominant colour in each of the adjacent tiles. This is illustrated for one dominant colour in the current tile, Cc1. From that the two smallest (shortest) distances are identified, in this case Cl1 and Ca2. The geometry of macroregions Cl1 and Ca2 decides the threshold and a comparison between the two shortest distances determines whether or not colour Cc1 is merged with either or neither of Cl1 or Ca2.

The net result of the process 950 described above is a multi-layered representation of a single layered image in which each layer represents a segment of the original image. By distinguishing between different segments of the source image, further processing may be performed on the layers or their respective content.

INDUSTRIAL APPLICABILITY

The above that the arrangements described are applicable to the computer and data processing industries and particularly for decomposition of colour documents for layout analysis.

The foregoing describes only some embodiments of the present invention, and modifications and/or changes can be made thereto without departing from the scope and spirit of the invention, the embodiments being illustrative and not restrictive.

We claim:

1. A method of classifying regions of a scanned document image, said method comprising the steps of:
    (a) partitioning the scanned image into a plurality of tiles;
    (b) determining at least one dominant colour for each of the plurality of tiles;
    (c) generating superpositioned regions based on the dominant colours, each said superpositioned region representing a group of tiles, wherein at least one tile is grouped into two superpositioned regions and each dominant colour is represented by at most one of the superpositioned regions, and wherein the generation of superposition regions comprises:
    (ca) converting each of the tiles into a representation having a plurality of layers, the representation corresponding to at least one said tiles comprising multiple coloured layers, each said tile comprising a superposition of the corresponding said coloured layers; and
    (cb) merging, for each of said coloured layers, adjacent ones of said tiles, thereby generating the superpositioned regions and a multi-layered document representation of the document;
    (d) calculating statistics for each said superpositioned region using pixel level statistics from each of the tiles included in said superpositioned region; and
    (e) determining a classification for each superpositioned region based on the calculated statistics.

2. A method according to claim 1, wherein each superpositioned region comprises a macroregion.

3. A method according to claim 2, wherein step (d) further comprises examining statistics of said macroregions and merging macroregions having a size considered to be noise.

4. A method according to claim 3, wherein the size considered to be noise is determined by using at least one of a coverage value and a border count approach.

5. A method according to claim 4, wherein the coverage value comprises those macroregions that cover less than a predetermined number of tiles of the document image.

6. A method according to claim 4, wherein the border count approach comprises those macroregions which have a tile border count greater than a predetermined percentage of the total number of pixels in the macroregion.

7. A method according to claim 2, wherein step (e) comprises the steps of:
(ea) ascribing an initial classification to each said macroregion based on colour and shape statistics associated with said macroregion; and
(eb) assessing relationships between said macroregions to optimise the classification by merging sufficiently related ones of said macroregions.

8. A method according to claim 7, wherein step (ea) comprises classifying a macroregion according to at least one of the following statistics:
(1) at least one of an average and variance of a the number of pixels in dominant colours included in the macroregion;
(2) a total number of dominant colours included in the macroregion;
(3) a ratio of the number of dominant colours to a bounding box area surrounding the macroregion;
(4) at least one edge ratio of the dominant colours in the macroregion;
(5) an average colour value for the macroregion;
(6) a number of tiles quantised to 3 or more colours;
(7) a number of other macroregions with which the macroregion shares tiles;
(8) a total number of pixels on the tile borders of the macroregion;
(9) a contrast level between the dominant colours in the macroregion and other dominant colours from the same tile; and
(10) a total number of dominant colours in the macroregion.

9. A method according to claim 7, wherein the initial classification ascribed each macroregion to one of three classes being: text, flat colour and image.

10. A method according to claim 9, wherein step (eb) comprises the steps of:
(eba) consolidating macroregions classified as image;
(ebb) detecting blends within the image and thereby merging corresponding macroregions;
(ebc) reclassifying macroregions based upon an extent of overlap between such 10 macroregions;
(ebd) merging foreground fragmented macroregions of the image to the same classification; and
(ebe) merging proximate macroregions having similar colours and the same classification.

11. A method according to claim 10, wherein step (ebc) comprises determining a cost function associated with pairs of macroregions and minimising the cost function to classify macroregions as text or flat.

12. A method according to claim 10, wherein step (ebd) comprises assessing the fragmentation using at least one of:
(1) a colour distance between the two macroregions;
(2) an overlap factor determined using a number of tiles in which two macroregions are present;
(3) a tile border factor associated with a number of pixels from each macroregion on a tile border;
(4) an edge ratio similarity factor based upon edge ratios of macroregions; and
(5) an amount of evidence factor based upon the incidence of evidence contributing to a likelihood of merging.

13. A method according to claim 2, further comprising the step of:
(f) forming a final output segmentation of said image by hierarchically associating at least one said macroregion within another said macroregion of different classification.

14. A non-transitory computer readable storage medium having a program recorded thereon, the program being executable by a computer to classify regions of a scanned document image, said program comprising:
code for partitioning the scanned image into a plurality of tiles;
code for determining at least one dominant colour for each of the plurality of tiles;
code for generating superpositioned regions based on the dominant colours, each said superpositioned region representing a group of tiles, wherein at least one tile is grouped into two superpositioned regions and each dominant colour is represented by at most one of the superposition regions, and wherein the code of generation of superpositioned regions comprises:
(a) code for converting each of the tiles into a representation having a plurality of layers, the representation corresponding to at least one said tiles comprising multiple coloured layers, each said tile comprising a superposition of the corresponding said colour layers; and
(b) code for merging, for each of said coloured layers, adjacent ones of said tiles, thereby generating the superpositioned regions and a multi-layered document representation of the document;
code for calculating statistics for each said superpositioned region using pixel level statistics from each of the tiles included in said superpositioned region; and
code for determining a classification for each superpositioned region based on calculated statistics.

15. A system for analysing and classification of a document, said system comprising:
a scanning device arranged to scan the document to form a raw pixel image of the document;
a computer apparatus configured to receive the image of the document and to partition the image into a plurality of tiles of predetermined size and to process the tiles in raster tile order, the processing comprising:
determining at least one dominant colour for each of the plurality of tiles
generating superpositioned regions based on the dominant colours, each said superpositioned region representing a group of tiles wherein at least one tile is grouped into two superpositioned regions and each dominant colour is represented by at most one of the superpositioned regions, said generating comprising:
(a) converting each of the tiles into a representation having a plurality of layers, the representation corresponding to at least one said tiles comprising multiple coloured layers, each said tile comprising a superposition of the corresponding said coloured layers; and
(b) merging, for each of said coloured layers, adjacent ones of said tiles, thereby generating the superpositioned regions and a multi-layered document representation of the document;
calculating statistics for each said superpositioned region using pixel level statistics from each of the tiles included in said superpositioned region; and determining a classification for each superpositioned region based on the calculated statistics.

16. The method of claim 1, further comprising simplifying the superpositioned regions by:
 (f) determining a text confidence value for each superpositioned region, representing a likelihood that said superpositioned region contains predominantly text-like content; and
 (g) merging together different superpositioned regions with text confidence values lower than a threshold to create a simplified representation.

* * * * *